(12) United States Patent
Kim et al.

(10) Patent No.: US 10,755,083 B2
(45) Date of Patent: Aug. 25, 2020

(54) TERMINAL FOR VEHICLE AND METHOD FOR AUTHENTICATING FACE

(71) Applicants: HYUNDAI MOTOR COMPANY, Seoul (KR); KIA MOTORS CORPORATION, Seoul (KR)

(72) Inventors: Sam Yong Kim, Hwaseong-si (KR); Yu Jin Yun, Suwon-si (KR); Seong Sook Ryu, Seoul (KR); Hwal Ly Lee, Seoul (KR); Byoung Joon Lee, Suwon-si (KR); Jin Kwon Kim, Suwon-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 178 days.

(21) Appl. No.: 16/043,912

(22) Filed: Jul. 24, 2018

(65) Prior Publication Data

US 2019/0340423 A1    Nov. 7, 2019

(30) Foreign Application Priority Data

May 4, 2018 (KR) ......................... 10-2018-0051841

(51) Int. Cl.

| G06K 9/00 | (2006.01) |
|---|---|
| B60R 25/24 | (2013.01) |
| B60R 25/25 | (2013.01) |
| B60R 25/20 | (2013.01) |
| G06F 21/32 | (2013.01) |

(52) U.S. Cl.
CPC ...... *G06K 9/00288* (2013.01); *B60R 25/2081* (2013.01); *B60R 25/245* (2013.01); *B60R 25/25* (2013.01); *G06F 21/32* (2013.01); *G06K 9/00248* (2013.01)

(58) Field of Classification Search
CPC .......... G06K 9/00255; G06K 9/00288; G06K 9/00221; G06K 9/00671; H04W 4/48; H04W 4/80; G06F 16/637
See application file for complete search history.

(56) References Cited

U.S. PATENT DOCUMENTS

| 10,414,377 | B2* | 9/2019 | Hoyos | ................ G07C 9/00563 |
|---|---|---|---|---|
| 2002/0097145 | A1* | 7/2002 | Tumey | .................... B60R 25/04 |
| | | | | 340/426.28 |
| 2008/0215209 | A1* | 9/2008 | Ikeda | .................... B60R 25/257 |
| | | | | 701/36 |
| 2010/0232658 | A1* | 9/2010 | Omoto | .................. B60R 25/255 |
| | | | | 382/118 |

(Continued)

*Primary Examiner* — Dung Hong
(74) *Attorney, Agent, or Firm* — Morgan, Lewis & Bockius LLP

(57) ABSTRACT

A vehicle terminal automatically registering a profile image of a user to a vehicle using images stored in a mobile terminal of a user and performing a face authentication includes a communicator that performs a data communication with the mobile terminal of the user, a camera that obtains a face image of the user, and a processor that registers the profile image of the user using an image among the images stored in the mobile terminal. The processor learns a facial feature of the user using the images stored in the mobile terminal as learning data and analyzes the face image obtained through the camera based on the learned facial feature of the user to perform the face authentication of the user.

18 Claims, 13 Drawing Sheets

(56) References Cited

U.S. PATENT DOCUMENTS

| | | | |
|---|---|---|---|
| 2013/0015946 A1* | 1/2013 | Lau | G06F 21/32 340/5.2 |
| 2013/0311001 A1* | 11/2013 | Hampiholi | B60R 25/25 701/1 |
| 2014/0129989 A1* | 5/2014 | Kim | G06N 3/006 715/838 |
| 2017/0140247 A1* | 5/2017 | Yoo | H04L 63/0861 |
| 2018/0188903 A1* | 7/2018 | Sirpal | H04N 21/4858 |
| 2018/0197029 A1* | 7/2018 | Ali | E05F 15/73 |
| 2019/0071055 A1* | 3/2019 | Luchner | G06F 21/32 |

* cited by examiner

US 10,755,083 B2

TERMINAL FOR VEHICLE AND METHOD FOR AUTHENTICATING FACE

CROSS-REFERENCE TO RELATED APPLICATION

This application is based on and claims the benefit of priority to Korean Patent Application No. 10-2018-0051841, filed on May 4, 2018, in the Korean Intellectual Property Office, the disclosure of which is incorporated herein in its entirety by reference.

TECHNICAL FIELD

The present disclosure relates to a terminal for a vehicle to perform a face authentication procedure using images stored in a user's terminal and a method for authenticating a face.

BACKGROUND

Functions, e.g., an integrated memory system (IMS), a user setting menu (USM), etc., which are set by a user (e.g., a driver), are increasing in vehicles. Particularly, in recent years, a user profile setting function, which collectively stores and retrieves information (setting values) set by the user, is being applied to the vehicle to improve convenience.

The conventional user profile setting function displays users, who are registered with textual usernames and emoticons, such as "Kim Gap-dol", "Hong Gil-dong", "Guest", and the like, on a screen 10 of a display device such as a cluster or an audio video navigation as shown in FIG. 1 to be distinguished from each other.

In addition, a conventional face authentication function recognizes the user through a face authentication procedure and retrieves setting information corresponding to the recognized user to apply the retrieved setting information to the vehicle. However, a face recognition performance of the conventional face authentication (recognition) function is deteriorated when there is a difference between a driver's condition, e.g., a change in driving posture, wearing sunglasses, a hairstyle, wearing hat, or the like, and a face registered with infrared (IR) image.

SUMMARY

The present disclosure has been made to solve the above-mentioned problems occurring in the prior art while advantages achieved by the prior art are maintained intact.

An aspect of the present disclosure provides a terminal for a vehicle and a method for authentication a face, which are capable of improving a face authentication performance using images stored in a user's terminal.

In addition, an aspect of the present disclosure provides a terminal for a vehicle, which is capable of automatically registering a user's profile image in the vehicle using the images stored in the user's terminal.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, a face authentication system including a vehicle terminal installed in a vehicle and a mobile terminal of a user, in which the vehicle terminal includes a communicator that performs a data communication with the mobile terminal of the user, a camera that obtains a face image of the user, and a processor that learns a facial feature of the user using images stored in the mobile terminal as learning data and analyzes the face image obtained through the camera based on the learned facial feature of the user to perform a face authentication of the user.

The communicator utilizes a short-range wireless communication technology corresponding to one of a Bluetooth and a near field communication (NFC).

The vehicle terminal further includes a sensing device to sense the user who is in a vehicle, and the processor performs an authentication procedure on the mobile terminal through the communicator when the user who is in the vehicle is sensed.

The processor outputs a welcome message through a display when the authentication procedure performed on the mobile terminal is completed.

The processor outputs a profile image of a user corresponding to the authenticated mobile terminal with the welcome message.

The processor identifies whether the user authenticated through the face authentication is a user who is restricted in driving and restricts a control operation with respect to the vehicle of the user in accordance with the identified result.

The processor transmits facial feature information of the user authenticated through the face authentication to the mobile terminal.

The mobile terminal extracts at least one or more images whose similarity with feature vectors included in the facial feature information of the user is equal to or greater than a reference similarity from images that are stored therein.

The processor registers a face image having a highest similarity with the feature vectors among the at least one or more images, which are provided from the mobile terminal, as the profile image.

The processor extracts a face image of another user from the at least one or more images provided from the mobile terminal, extracts feature vectors from the extracted face image, and adds the extracted feature vectors to the learning data.

According to another aspect of the present disclosure, a method for authenticating a face of a user through a face authentication system including a vehicle terminal installed in a vehicle and a mobile terminal of the user, in which the method includes allowing the vehicle terminal to learn a facial feature of the user using images stored in the mobile terminal as learning data and allowing the vehicle terminal to analyze a face image obtained through a camera and to perform a face authentication based on the learned facial feature.

The method further includes allowing the vehicle terminal to obtain at least one or more face images from the mobile terminal of the authenticated user using facial feature information of the user authenticated through the face authentication and allowing the vehicle terminal to register one image among the obtained at least one or more face images as a profile image of the user.

The performing of the face authentication includes sensing whether the user is in a vehicle, performing an authentication procedure on the mobile terminal, and outputting a welcome message when the authentication procedure of the mobile terminal is successful.

The welcome message is displayed with the profile image of the user corresponding to the authenticated mobile terminal.

The method further includes allowing the vehicle terminal to identify whether the authenticated user is a user who is restricted in driving and allowing the vehicle terminal to restrict a control operation with respect to the vehicle by the authenticated user when the authenticated user is the user who is restricted in driving after the performing of the face authentication.

The mobile terminal extracts at least one or more face images whose similarity with facial feature vectors included in facial feature information of the authenticated user is equal to or greater than a reference similarity and transmits the extracted at least one or more face images to the vehicle terminal in the obtaining of the at least one or more face images from the mobile terminal of the user.

The vehicle terminal registers a face image having a highest similarity with the facial feature vectors among the at least one or more images, which are provided from the mobile terminal, as the profile image of the user in the registering of the profile image of the user.

The vehicle terminal utilizes the at least one or more face images provided from the mobile terminal as the learning data to learn the facial feature of the user when the profile image is registered.

The vehicle terminal extracts a face image of another user from the at least one or more images provided from the mobile terminal, extracts feature vectors from the extracted face image, and adds the extracted feature vectors to the learning data.

The vehicle terminal transmits or receives data to or from the mobile terminal utilizing a short-range wireless communication technology corresponding to one of a Bluetooth and a near field communication (NFC).

According to the above, when registering the user profile, the user profile image is automatically registered using the images stored in the user terminal, and thus visibility may be improved and personalization setting effect may increase.

In addition, since the present disclosure learns the facial features of the user and others using the images stored in the user terminal as the learning data, the performance on the face authentication (recognition) may be improved.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
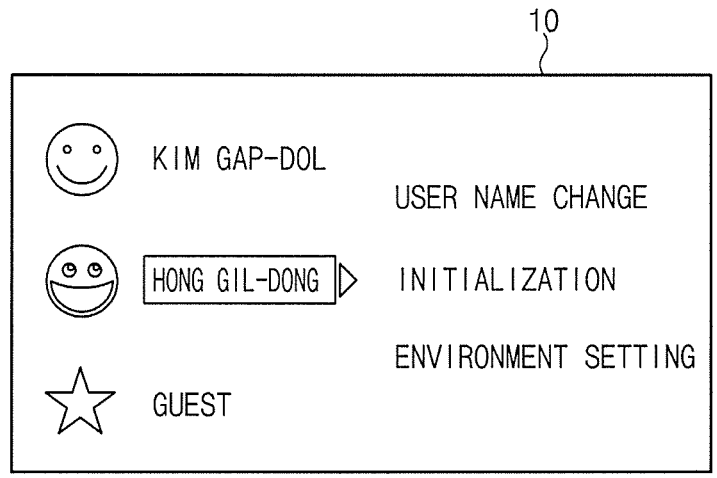
FIG. 1 is a view illustrating a user profile setting screen according to a conventional art.

Hereinafter, exemplary embodiments of the present disclosure will be described in detail with reference to the accompanying drawings. In the drawings, the same reference numerals will be used throughout to designate the same or equivalent elements. In addition, a detailed description of well-known features or functions will be ruled out in order not to unnecessarily obscure the gist of the present disclosure.

In describing elements of exemplary embodiments of the present disclosure, the terms $1^{st}$, $2^{nd}$, first, second, A, B, (a), (b), and the like may be used herein. These tautis are only used to distinguish one element from another element, but do not limit the corresponding elements irrespective of the order or priority of the corresponding elements. Unless otherwise defined, all terms used herein, including technical or scientific teams, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

The present disclosure relates to a technique for improving convenience by recognizing a driver's face and automatically setting an environment of a vehicle for the driver. When setting a user profile in the vehicle, the present disclosure allows a user's face image stored in a mobile terminal of a user (user terminal) to be automatically registered as a profile image.

According to the present disclosure, the face image of the driver is stably acquired regardless of nighttime or ambient lighting condition by an infrared ray (IR) camera applied to a driver state warning (DSW) system. The IR image obtained through the IR camera has a less preferable aesthetic impression than an image obtained by a normal camera since the IR image is grayscale and has great contrast, and a camera angle faces an upper direction from the bottom of the face. Thus, according to the present disclosure, the driver face authentication performance is improved utilizing the photos (images) stored in the mobile terminal of the user (e.g., a smartphone).

Figure 2:
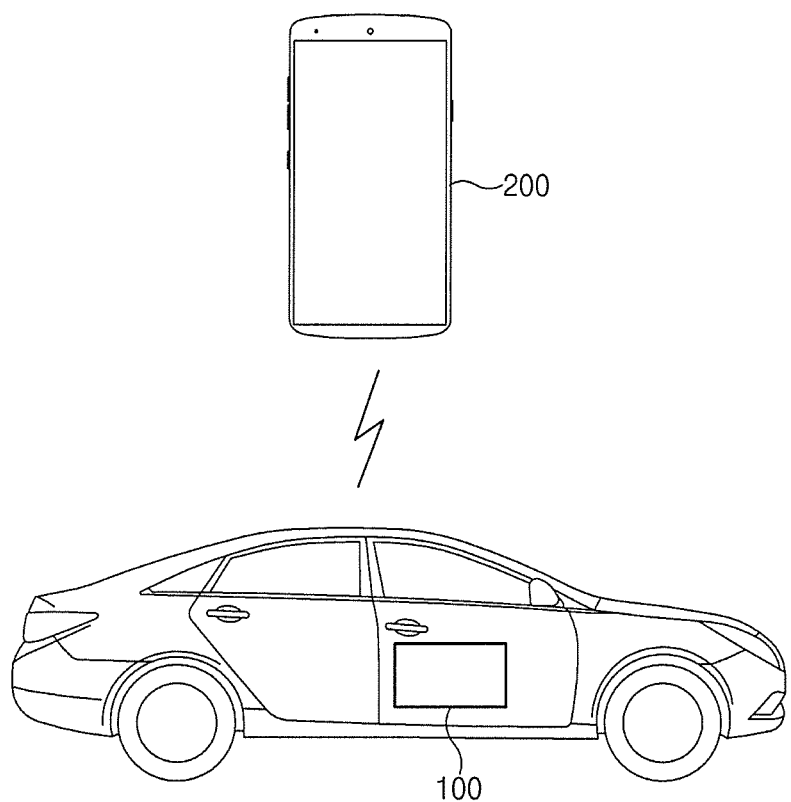
FIG. 2 is a view illustrating a configuration of a face authentication system according to an exemplary embodiment of the present disclosure.
Figure 3:
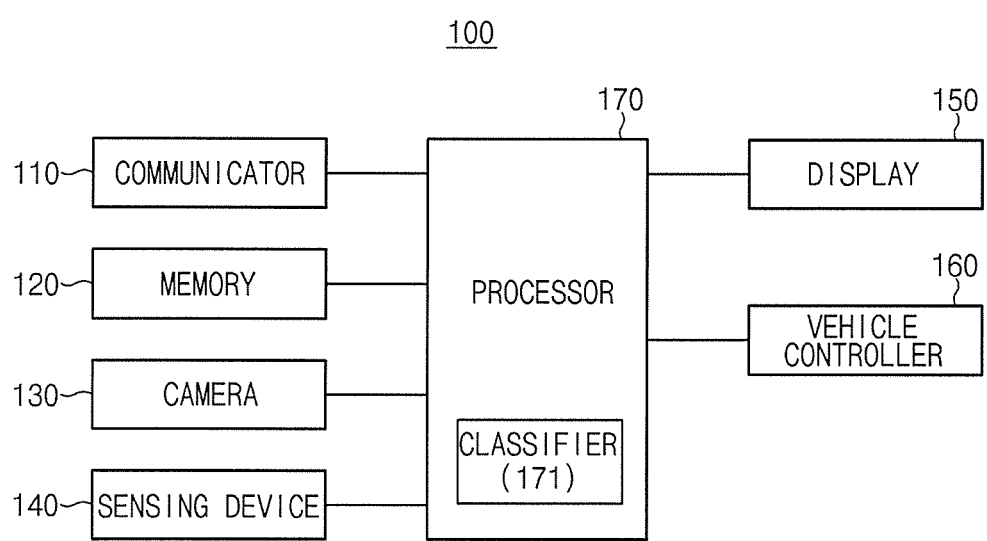
FIG. 3 is a block diagram illustrating a vehicle terminal shown in FIG. 2.
Figure 4:
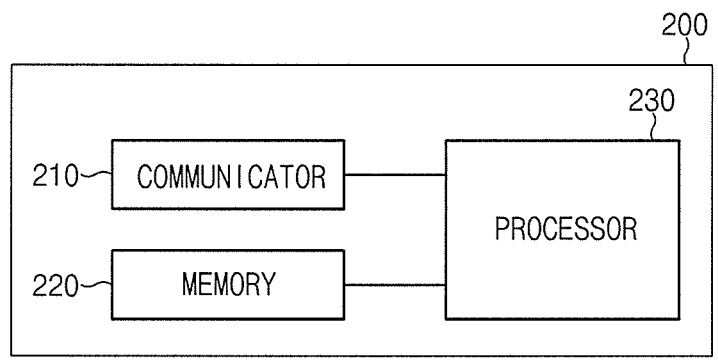
FIG. 4 is a block diagram illustrating a mobile terminal shown in FIG. 2.

FIG. 2 is a view illustrating a configuration of a face authentication system according to an exemplary embodiment of the present disclosure, FIG. 3 is a block diagram illustrating a vehicle terminal shown in FIG. 2, and FIG. 4 is a block diagram illustrating a mobile terminal shown in FIG. 2.

Referring to FIG. 2, the face authentication system according to an exemplary embodiment of the present disclosure may include a vehicle terminal 100 installed in a vehicle and a mobile terminal 200 held by a user.

The vehicle terminal 100 may be an electric control unit (ECU) and may control an overall function of the vehicle. The vehicle terminal 100 may set a profile and a vehicle's environment for each user (e.g., a driver). In this case, the vehicle terminal 100 may set information, such as identification information (ID), a user name, mobile terminal information (e.g., a serial number, an access address, etc.), facial feature vectors, a profile image, information indicating whether the user (driver) is underage, information indicating whether the driver is restricted in driving, etc., as profile information. In addition, the vehicle terminal 100 may set information, such as a seat position, an angle of a room mirror, an angle of a side mirror, a position of a steering wheel, etc., as vehicle environment information using a variety of sensors.

The mobile terminal 200 may be implemented by an electronic device, e.g., a cellular phone, a smartphone, a notebook computer, a tablet terminal, a personal digital assistant, a wearable device, etc.

The vehicle terminal 100 and the mobile terminal 200 may exchange data (information) with each other using a short-range wireless communication technology, such as a Bluetooth, a near field communication (NFC), and the like.

Referring to FIGS. 3 and 4, the vehicle terminal 100 may include a communicator 110, a memory 120, a camera 130, a sensing device 140, a display 150, a vehicle controller 160, and a processor 170, and the mobile terminal 200 includes a communicator 210, a memory 220, and a processor 230.

The communicator 110 of the vehicle terminal 100 may perform a data communication with the communicator 210 of the mobile terminal 200. The communicator 110 may perform a pairing and a communication connection with the mobile terminal 100 under a control of the processor 170 of the vehicle terminal 100.

The communicator 110 of the vehicle terminal 100 and the communicator 210 of the mobile terminal 200 each may be a hardware device implemented with various electronic circuits to transmit and receive signals via wireless or landline connections.

The memories 120 and 220 may store a software programmed to allow the vehicle terminal 100 and the mobile terminal 200 to perform predetermined operations. The memories 120 and 220 may temporarily store input data and/or output data of the processors 170 and 230, respectively.

The memory 120 of the vehicle terminal 100 may store profile information for each user whose profile image is registered and the information about the vehicle's environment. The memory 120 may store learning data, which are used to learn facial features of the user (registrant, driver) whose profile image is registered, in a database. The learning data may be facial feature vectors extracted from an image (e.g., an IR image) obtained through the camera 130 or facial feature vector(s) extracted from an image(s) stored in the mobile terminal 200.

In addition, the memory 120 may store facial feature information of a user (non-registrant, others, a user who does not drive) whose profile image is not registered, in a database. The facial feature information of the registrant and the non-registrant are used as the learning data.

The memory 220 of the mobile terminal 200 may store an image provided thereto through the communicator 210 or may store images obtained through a camera (not shown) mounted on the mobile terminal 200.

The memories 120 and 220 may be implemented by at least one storage medium (recording medium) among storage media, such as a flash memory, a hard disk, a secure digital (SD) card, a random access memory (RAM), a read only memory (ROM), an electrically erasable and programmable ROM (EEPROM), an erasable and programmable ROM (EPROM), a flash-EPROM, a register, a removable disk, a buffer, a web storage, etc.

The camera 130 may be located in front of a driver's seat in the vehicle and may photograph (obtain) the face image of the user, i.e., the driver, seated on the driver's seat. The camera 130 may be an infrared ray (IR) camera and may include an infrared ray source and a charge coupled device (CCD) image sensor. The camera 130 may be implemented by an integrated infrared camera including a near infrared ray source using a laser and an image intensifier. The infrared camera may be mainly used in the driver state warning (DSW) system and may stably obtain the face image of the driver regardless of nighttime or ambient lighting conditions.

The camera 130 may transmit the photographed face image of the user to the processor 170. In this case, the face image may be a gray scale infrared image. The camera 130 may include an image processor that performs an image processing operation, e.g., a noise removal, a color reproduction, an image quality and chroma control, a file compression, etc., on the face image of the user, which is photographed by the camera 130.

The sensing device 140 may sense whether the driver gets in the vehicle. That is, the sensing device 140 may sense (determine) whether the user is in the driver's seat. The sensing device 140 may sense whether the user is in the driver's seat through a pressure sensor mounted on a seat (e.g., the driver's seat). As another way, the sensor 140 may sense whether a driver's door is opened or closed through a door opening/closing sensor to determine whether the driver gets in the vehicle. As another example, the sensing device 140 may sense whether the driver gets in the vehicle through the camera 130 or a motion sensor (not shown). When the sensing device 140 senses that the driver gets in the vehicle, the sensing device 140 may transmit a message (signal), which indicates that the driver gets in the vehicle, to the processor 170.

In the present embodiment, the sensing device 140 determines whether the driver gets in the vehicle by using one of the pressure sensor, the door opening/closing sensor, the camera, and the motion sensor, but the sensing device 140 should not be limited thereto or thereby. That is, the sensing device 140 may be implemented to determine whether the driver gets in the vehicle by using at least two or more sensors among the pressure sensor, the door opening/closing sensor, the camera, and the motion sensor.

The display 150 may display a progress state and a processing result according to the operation of the vehicle terminal 100. In addition, the display 150 may display the user profile information, a user interface (UI) or a graphic user interface (GUI) related to user settings, vehicle information, and the like.

The display 150 may be implemented by at least one of a liquid crystal display (LCD), a thin film transistor liquid crystal display (TFT-LCD), an organic light emitting diode (OLED) display, a flexible display, a three-dimensional (3D) display, a transparent display, a head-up display (HUD), a touch screen, or a cluster.

The vehicle controller 160 may control starting, power, braking, steering, and shifting of the vehicle. The vehicle controller 160 may control the vehicle through actuators, such as an engine controller, a brake controller, a steering controller, a shift controller, etc., which are connected through an in-vehicle networking (IVN).

The processor 170 of the vehicle terminal 100 may control an overall operation of the vehicle terminal 100. The processor 170 may include at least one of an application specific integrated circuit (ASIC), a digital signal processor (DSP), programmable logic devices (PLD), field programmable gate arrays (FPGAs), a central processing unit (CPU), microcontrollers, or microprocessors.

The processor 170 of the vehicle terminal 100 may include a classifier 171 that recognizes (classifies) the face of the user in the image obtained through the camera 130 using a face recognition algorithm. The classifier 171 may analyze the face image of the user (driver) obtained through the camera 130 to classify the user into the registrant or non-registrant.

The processor 170 of the vehicle terminal 100 may sense that the driver gets in the vehicle through the sensing device 140 when the user is seated in the driver's seat. When the processor 170 senses that the driver gets in the vehicle, the processor 170 may perform an authentication procedure on the mobile terminal 200 through the communicator 110. In this case, the processor 170 may send a scan request signal through the communicator 110. The processor 170 may receive a scan response signal with respect to the scan request signal provided from the mobile terminal 200 through the communicator 110. The processor 170 may determine whether the mobile terminal 200 is a mobile terminal of the user, who is registered in the vehicle, based on the identification information (e.g., the serial number, the access address, etc.) of the mobile terminal 200, which are included in the scan response signal. That is, the processor 170 may search whether the mobile terminal 200 which has previously undergone a pairing process exists. For example, the processor 170 may retrieve the user profile information including the mobile terminal information that match the identification information of the mobile terminal 200 from the profile information for each user stored in the memory 120.

When the authentication procedure on the mobile terminal 200 is successful, the processor 170 may perform the communication connection with the communicator 210 of the mobile terminal 200 through the communicator 110. Then, the processor 170 may output a welcome message to the display 150. In this case, the processor 170 may output a profile image of the user corresponding to the authenticated mobile terminal 200 when outputting the welcome message. In addition, the processor 170 may output the welcome message through a speaker as an audio signal.

Meanwhile, when the authentication procedure on the mobile terminal 200 is failed, the processor 170 may perform a new user registration procedure or a mobile terminal information update procedure of a user who is previously registered.

The processor 170 of the vehicle terminal 100 may perform the face authentication (i.e., a driver authentication) on the user through the camera 130 after outputting the welcome message. The processor 170 may recognize the face of the user from the image obtained through the camera 130 and may determine whether there is a registered user's face whose similarity with the recognized user's face is equal to or greater than a threshold value in the image obtained through the camera 130. The processor 170 may compare a feature vector of the recognized user's face through the camera 130 with a feature vector of the registered user's face and may retrieve the registered user's face in which similarity of the two feature vectors is equal to or greater than a threshold value.

When there is the registered user's face whose similarity with the recognized user's face is equal to or greater than the threshold value, the processor 170 may transmit the feature information of the recognized user's face to the mobile terminal 200. The feature information of the recognized user's face may include the feature vector of the user's face. In this case, since the processor 170 transmits feature vector(s) robust to lighting or user posture rather than the infrared image (raw image) obtained through the camera 130, a difference between the infrared image and a color (RGB) image stored in the mobile terminal 200 may be reduced.

The processor 170 of the vehicle terminal 100 may receive at least one face image transmitted from the mobile terminal 200 through the communicator 110 after transmitting the feature vector(s) of the user's face to the mobile terminal 200. In this case, the processor 230 of the mobile terminal 200 may extract one or more images whose similarity with the feature vector(s) of the user's face is equal to or greater than a reference similarity in the images stored in the memory 220. That is, the processor 230 of the mobile terminal 200 may extract (select) one or more images including the user's face recognized through the camera 130 of the vehicle terminal 100 among the images stored in the memory 220 and may transmit the extracted image(s) to the vehicle terminal 100. Meanwhile, the processor 230 of the mobile terminal 200 may transmit the whole images stored in the memory 220 to the vehicle terminal 100.

The processor 170 of the vehicle terminal 100 may register the face image having the highest similarity with respect to the feature vector(s) of the user's face among one or more received face images as the profile image. As another way, when there are two or more face images having the highest similarity with respect to the feature vector(s) of the user's face among the one or more received face images, the processor 170 may recommend the face image for the profile image of the user based on a predetermined reference or may select the face image for the profile image depending on a user's input.

When there is no face image transmitted from the mobile terminal 200, the processor 170 may allow the user to select whether to register the face image obtained through the camera 130 as the profile image of the user. Meanwhile, when the user does not select the face image obtained through the camera 130 as the profile image, the processor 170 may register an emoticon as the profile image.

When registering the profile image, the processor 170 may utilize the one or more received face images provided from the mobile terminal 200 as the learning data. The processor 170 may update the feature vector(s) of the user's face using the feature vector(s) extracted from the face image obtained through the camera 130 and the feature vector(s) extracted from the at least one face image provided from the mobile terminal 200. That is, the processor 170 may add the feature vector(s) extracted from the face image obtained through the camera 130 and the feature vector(s) extracted from the at least one face image provided from the mobile terminal 200 to the learning data to learn the features of the user's face.

The processor 170 of the vehicle terminal 100 may register others (e.g., friends, family members, etc.) other than the user in advance using the images stored in the memory 220. For example, the mobile terminal 200 may extract the face image of the family members from the images stored in the memory 220 in response to a user's operation and may transmit the extracted face image of the family members to the vehicle terminal 100. The vehicle terminal 100 may generate and register the profile information of the user using the face image provided from the mobile terminal 200. Then, when the user recognized through the camera 130 is underage or is restricted in driving, the processor 170 may restrict the driving of the recognized user. For instance, when a face image of a minor child is registered in advance and the minor child gets in the driver's seat, the processor 170 may switch a mode of the vehicle to a drive prohibiting mode to ban a start-up or departure of the vehicle.

When the registration of the profile image is completed, the processor 170 of the vehicle terminal 100 may allow the classifier 171 to learn using the registered profile image. The classifier 171 may update the facial feature information about the user (registrant) using the facial feature vector(s) of the user (registrant) extracted from the image obtained through the camera 130 during the profile image registration process and the facial feature vector(s) of the user (registrant) extracted from the images stored in the memory 220 of the mobile terminal 200. In this case, the classifier 171 may update the facial feature information of the non-registrant using the facial feature vector(s) of the non-registrant extracted from the images stored in the memory 220 of the mobile terminal 200. The classifier 171 may learn the facial features of the registrant and the non-registrant using the updated facial feature information of the registrant and non-registrant to improve the face recognition performance. Then, the processor 170 may recognize (authenticate) the user from the face image, which is obtained through the camera 130, using the learned classifier 171.

As described above, since the present disclosure may allow the classifier 171 to learn the facial features of not only the user (registrant) whose profile image is registered but also the user (non-registrant) whose profile image is not registered, a probability of misrecognizing the non-registrant as the registrant may be reduced. For example, since the classifier 171 learns facial features of not only the user but also others of the family with similar looks to the user, which are included in family photos stored in a smartphone of the user, more precise face recognition may be available.

Figure 5:
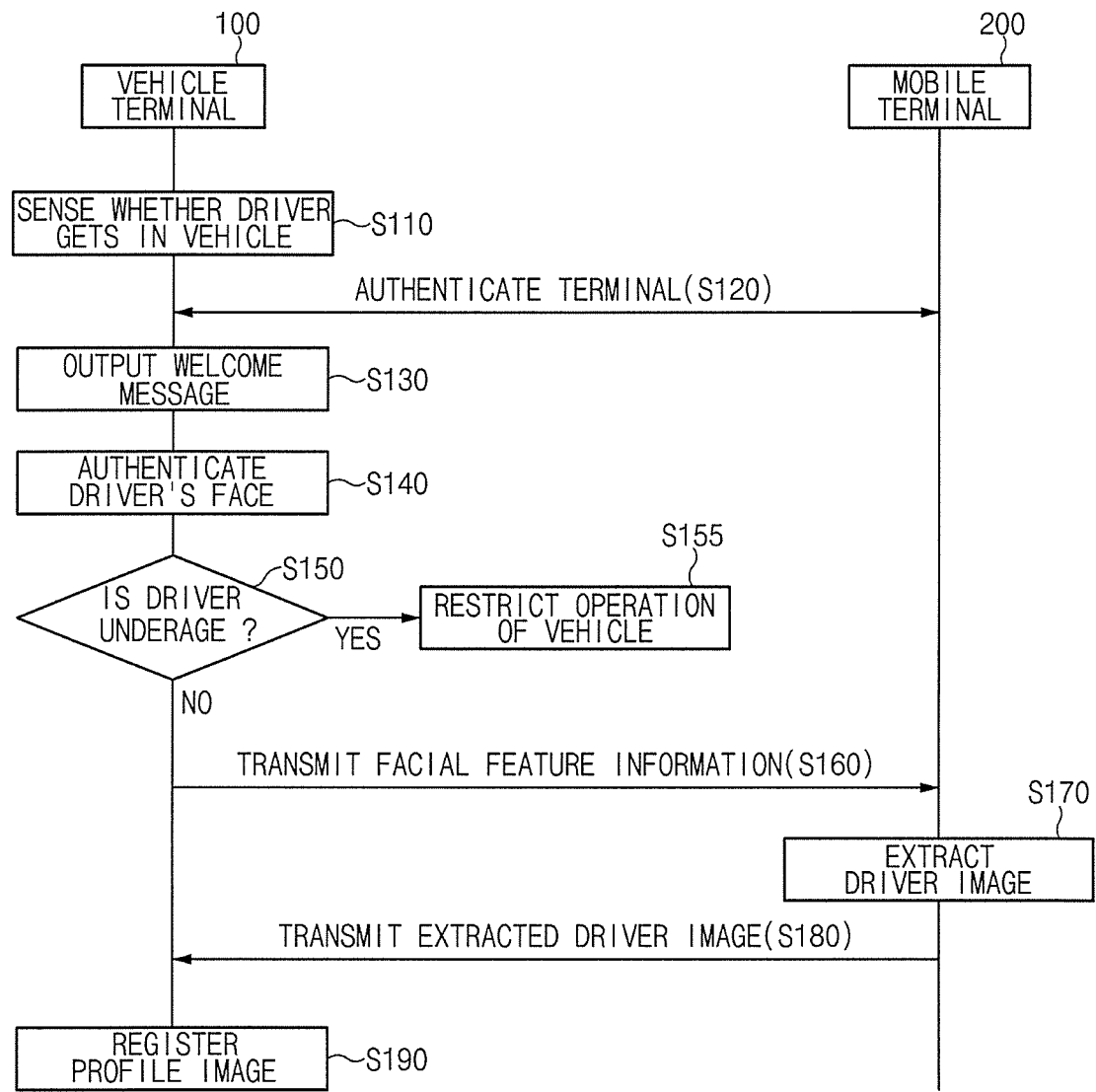
FIG. 5 is a flowchart illustrating a method of registering a profile image according to an exemplary embodiment of the present disclosure.
Figure 6:
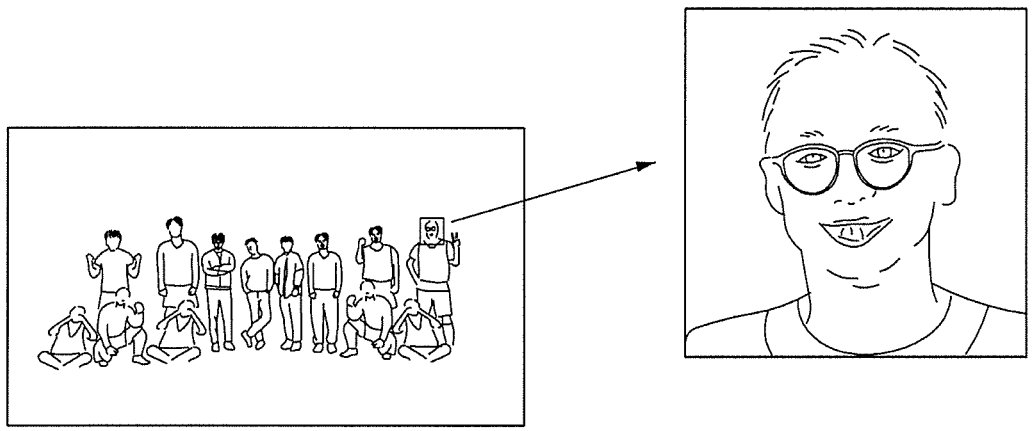
FIG. 6 is a view illustrating an operation of extracting a facial image according to an exemplary embodiment of the present disclosure.
Figure 7:
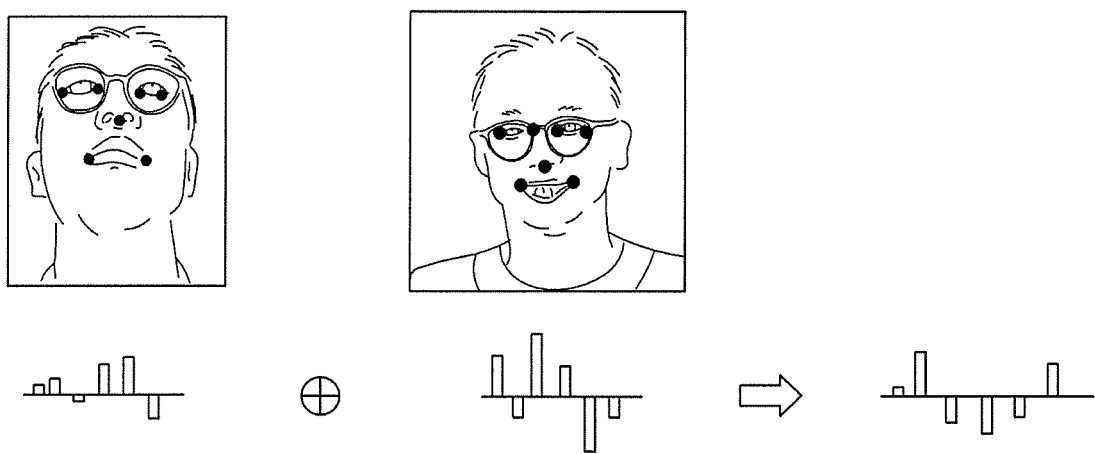
FIG. 7 is a view illustrating an operation of updating a facial feature of a driver according to an exemplary embodiment of the present disclosure.
Figure 8:
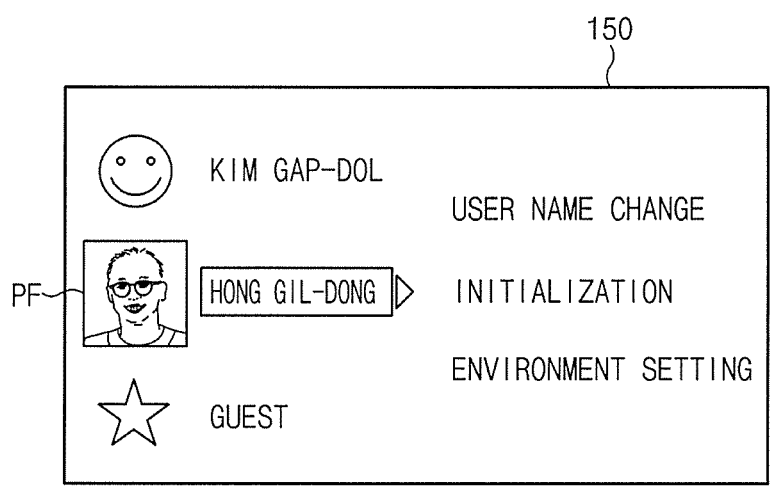
FIG. 8 is a view illustrating a user profile setting screen according to an exemplary embodiment of the present disclosure.

FIG. 5 is a flowchart illustrating a method of registering a profile image according to an exemplary embodiment of the present disclosure, FIG. 6 is a view illustrating an operation of extracting a facial image according to an exemplary embodiment of the present disclosure, FIG. 7 is a view illustrating an operation of updating a facial feature of a driver according to an exemplary embodiment of the present disclosure, and FIG. 8 is a view illustrating a user profile setting screen according to an exemplary embodiment of the present disclosure.

The vehicle terminal 100 senses whether the driver gets in the vehicle (S110). The vehicle terminal 100 identifies whether there is a user who is seated in the driver's seat through the sensing device 140.

When the vehicle terminal 100 senses the driver who gets in the vehicle, the vehicle terminal 100 performs the authentication procedure on the mobile terminal 200 (S120). The vehicle terminal 100 sends the scan request signal through the communicator 110 of the vehicle terminal 100. When receiving the scan request signal through the communicator 210, the mobile terminal 200 transmits the scan response signal including its serial number. The vehicle terminal 100 receives the scan response signal through the communicator 110 and retrieves a serial number matching the serial number included in the scan response signal from the profile information for each user. The vehicle terminal 100 establishes a communication channel with the mobile terminal 200 when the serial number matching the serial number of the mobile terminal 200 is retrieved from the profile information for each user stored in the memory 120.

When the authentication procedure with respect to the mobile terminal 200 is completed, the vehicle terminal 100 outputs the welcome message (S130). The vehicle terminal 100 displays the profile image of the user corresponding to the serial number of the mobile terminal 200 with the welcome message through the display 150.

The vehicle terminal 100 performs the face authentication (i.e., driver authentication) on the user (driver) through the camera 130 after outputting the welcome message (S140). The vehicle terminal 100 recognizes the user's face from the image obtained through the camera 130 and extracts the feature vector(s) of the recognized user's face. The vehicle terminal 100 retrieves the feature vector(s) whose similarity with the extracted feature vector(s) is equal to or greater than the threshold value from the profile information for each user. When the feature vector(s) matching the extracted feature vector(s) is retrieved, the vehicle terminal 100 identifies the driver (e.g., a user's ID) corresponding to the retrieved feature vector(s).

The vehicle terminal 100 determines whether the user identified through the face authentication is underage (S150). When the identified user is the underage, the vehicle terminal 100 restricts a control operation with respect to the vehicle (S155). That is, when the identified user is restricted in driving, the vehicle terminal 100 bans the start-up and departure of the vehicle.

Meanwhile, when the identified user is not the underage, the vehicle terminal 100 transmits the facial feature information of the user to the mobile terminal 200 (S160).

The mobile terminal 200 extracts at least one user image from the images stored in the memory 220 based on the facial feature information of the user transmitted from the vehicle terminal 100 (S170). For example, as shown in FIG. 6, the mobile terminal 200 extracts the face image whose similarity with the feature vector(s) of the user's face is equal to or greater than the reference similarity from the images stored in the memory 220. That is, the mobile terminal 200 selects the image including the user's face among the images stored in the memory 220.

The mobile terminal 200 transmits the extracted at least one user image to the vehicle terminal 100 (S180). The processor 230 of the mobile terminal 200 transmits the extracted face image to the vehicle terminal 100 through the communicator 210.

The vehicle terminal 100 automatically registers the profile image of the user using the at least one user image extracted from the mobile terminal 200 (S190). That is, the vehicle terminal 100 updates the profile image of the user (the identified user ID) authenticated with the image having the highest similarity with the feature vector(s) of the user's face in the at least one user image extracted from the mobile terminal 200. The updated profile image is displayed through the display 150 with the welcome message when the corresponding driver gets in the vehicle again. As another example, the vehicle terminal 100 displays the updated profile image PF on a user setting screen as shown in FIG. 8.

The vehicle terminal 100 extracts the feature vectors(s) of the user's face from the at least one user image extracted from the mobile terminal 200 and adds the extracted feature vector(s) to the learning data. As shown in FIG. 7, the vehicle terminal 100 combines the feature vector(s) of the user's face obtained through the camera 130 with the feature vector(s) of the user's (driver's) face extracted from the driver image extracted from the mobile terminal 200 to update the facial feature vector(s) included in the profile information of the corresponding user.

Figure 9:
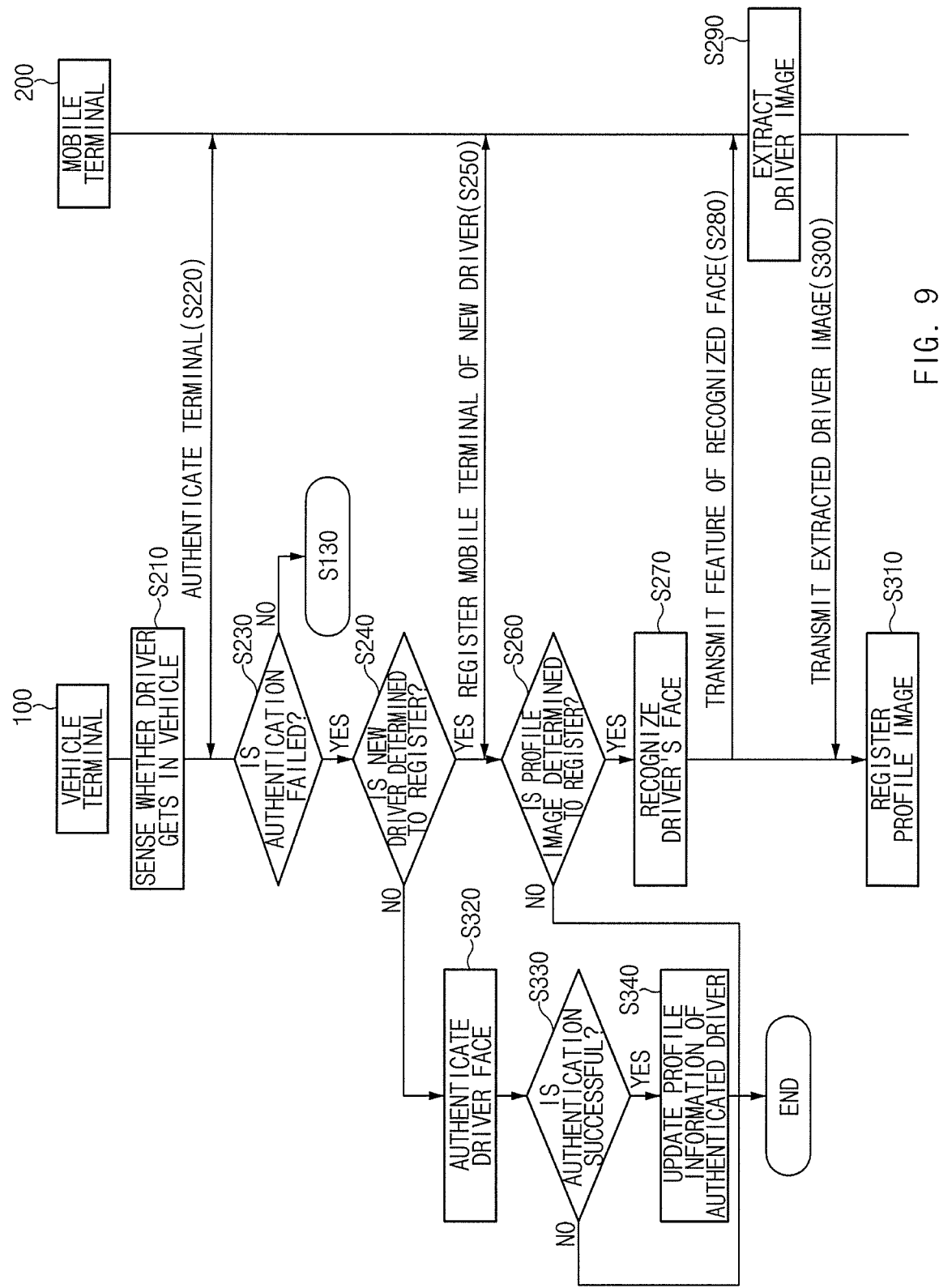
FIG. 9 is a flowchart illustrating a profile image registration method according to another exemplary embodiment of the present disclosure.

FIG. 9 is a flowchart illustrating a profile image registration method according to another exemplary embodiment of the present disclosure.

Referring to FIG. 9, the processor 170 of the vehicle terminal 100 senses whether the driver gets in the vehicle (S210). When the vehicle terminal 100 senses the driver who gets in the vehicle, the vehicle terminal 100 performs the authentication procedure on the mobile terminal 200 (S220).

When the authentication procedure on the mobile terminal 200 is failed (S230), the vehicle terminal 100 identifies whether to register a new driver (S240). The vehicle terminal 100 displays a selection screen through the display 150 allowing the user to select whether to register the new driver and determines whether to register the new driver in response to a user's selection.

When the registration of the new driver is determined, the vehicle terminal 100 performs a registration procedure with respect to the mobile terminal 200 of the new driver (S250). That is, the vehicle terminal 100 performs the pairing with the mobile terminal 200. In this case, the vehicle terminal 100 assigns an ID to the new driver and stores information of the mobile terminal 200 being paired with the vehicle terminal 100 in the profile information corresponding to the ID.

When the registration with respect to the mobile terminal 200 of the new driver is completed, the vehicle terminal 100 identifies whether to register the profile image (S260). In this case, the vehicle terminal 100 determines whether to register the profile image in response to the user's selection.

When the profile image is determined to be registered, the vehicle terminal 100 recognizes the face of the new driver through the camera 130 (S270). That is, the vehicle terminal 100 obtains the face image of the new driver (user) through the camera 130 and extracts the feature information (feature vector(s)) of the new driver from the obtained face image.

The vehicle terminal 100 transmits the feature information of the face of the recognized new driver to the mobile terminal 200 (S280). The vehicle terminal 100 transmits the feature information of the face of the new driver to the mobile terminal 200 through a communication channel established between the communicator 110 and the mobile terminal 200.

The mobile terminal 200 extracts at least one new driver image among the images stored in the memory 220 based on the feature information of the face of the new driver, which are provided from the vehicle terminal 100 (S290). The processor 230 of the mobile terminal 200 extracts the face image whose similarity with the feature vector(s) of the face of the new driver is equal to or greater than the reference similarity among the images stored in the memory 220.

The mobile terminal 200 transmits the extracted at least one new driver image to the vehicle terminal 100 (S300).

The vehicle terminal 100 receives the at least one new driver image from the mobile terminal 200 and registers a profile image of the new driver (S310). The vehicle terminal 100 registers the image having the highest similarity with the feature vector(s) of the face of the new driver in the received at least one new driver image as the profile image of the new driver.

In operation S240, the vehicle terminal 100 performs the face authentication on the driver through the camera 130 when the user in the driver's seat does not want to register the new driver (S320).

When the face authentication on the driver is successful, the vehicle terminal 100 updates the profile information of the authenticated driver (S330). The vehicle terminal 100 performs the pairing with the mobile terminal 200, and then the vehicle terminal 100 updates the mobile terminal information in the profile information of the authenticated driver to the information associated with the corresponding mobile terminal 200.

Figure 10:
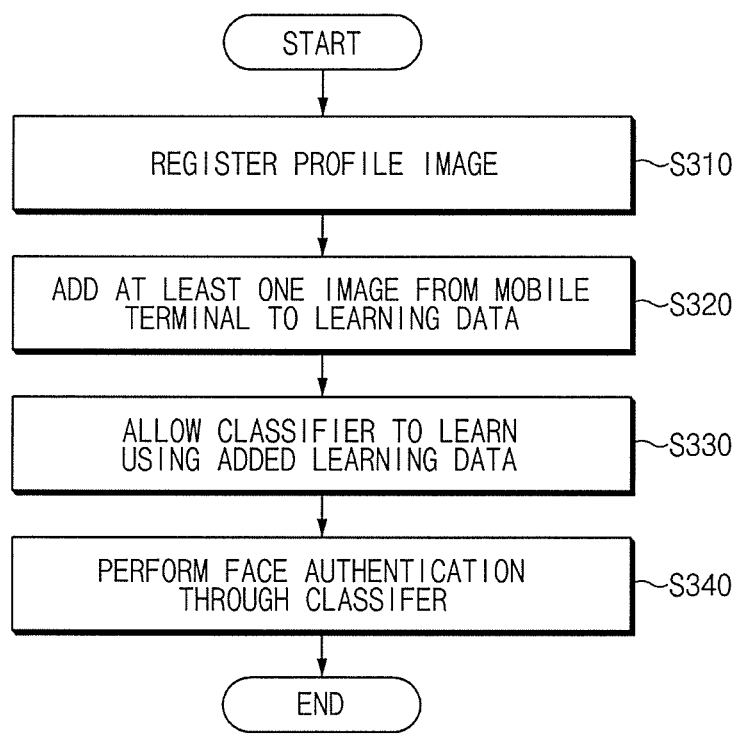
FIG. 10 is a flowchart illustrating a face authentication method according to another exemplary embodiment of the present disclosure.
Figure 11:
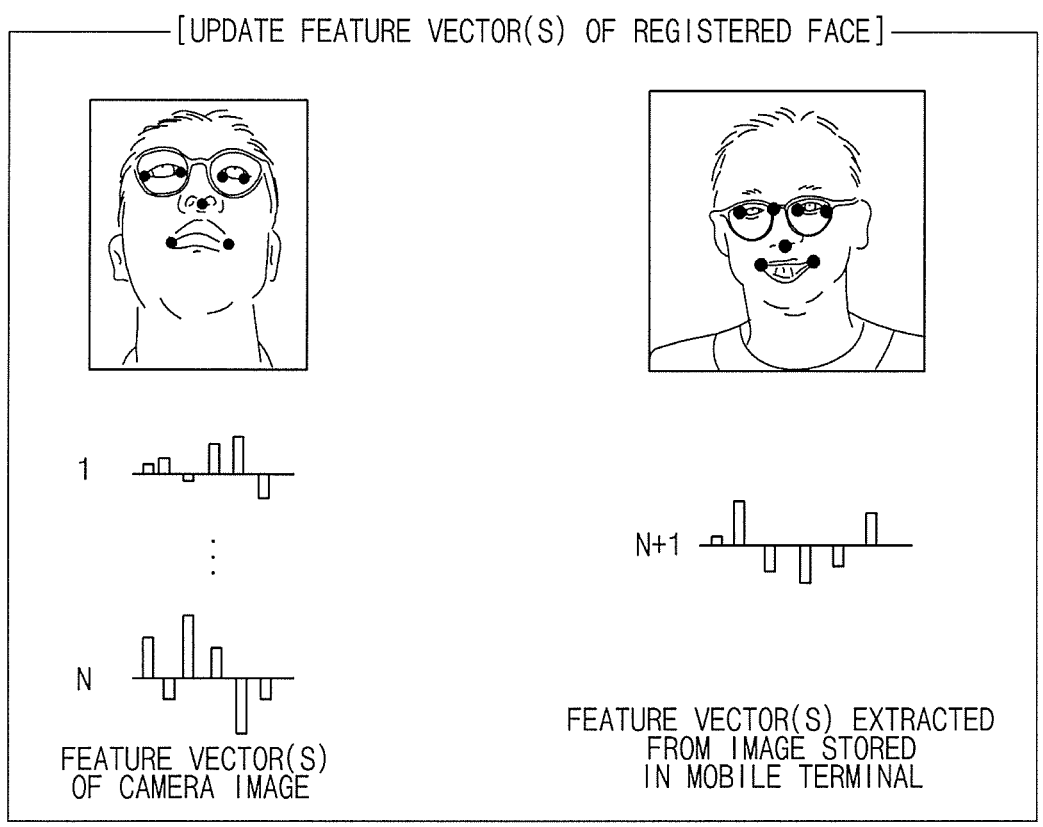
FIGS. 11 and 12 are views illustrating an operation of updating facial feature information according to an exemplary embodiment of the present disclosure.
Figure 12:
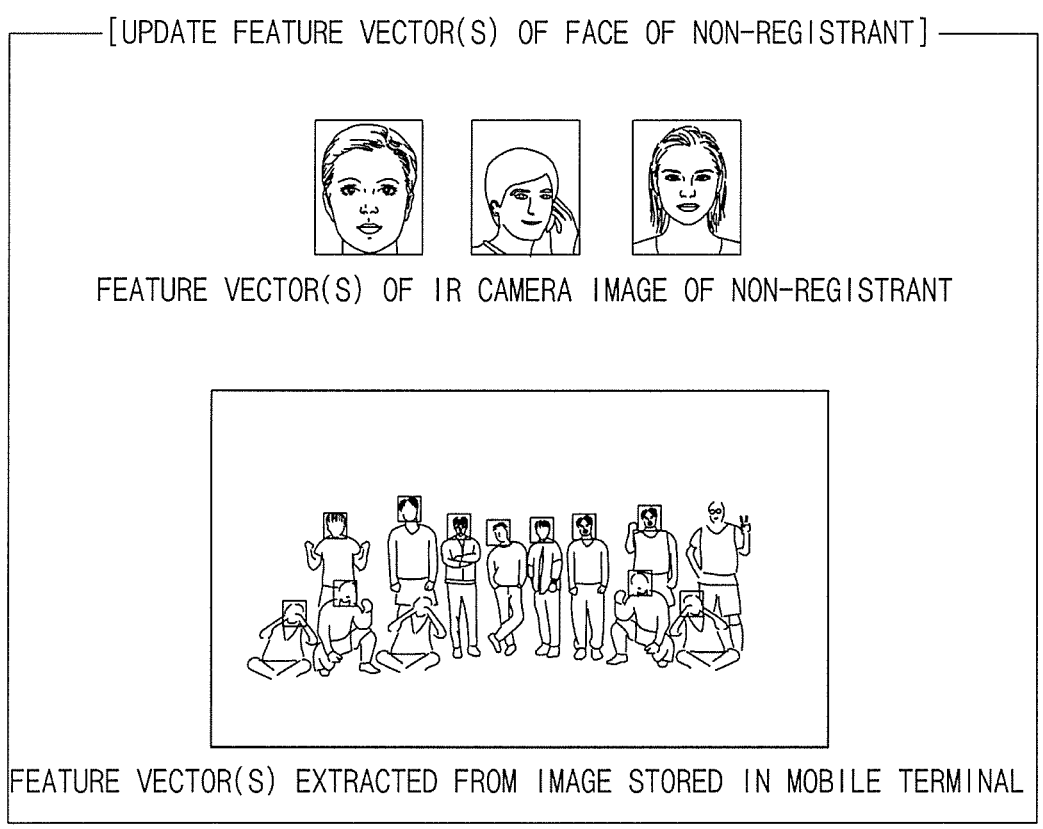

FIG. 10 is a flowchart illustrating a face authentication method using a profile image according to an exemplary embodiment of the present disclosure, and FIGS. 11 and 12 are views illustrating an operation of updating facial feature information according to an exemplary embodiment of the present disclosure.

The processor 170 registers the profile image in accordance with the procedures shown in FIGS. 5 and 9 (S310). The processor 170 extracts the face image of the user from the images stored in the mobile terminal 200 of the user and registers the extracted face image as the profile image.

After registering the profile image, the processor 170 adds the at least one image provided from the mobile terminal 200 when registering the profile image to the learning data (S320). In this case, the processor 170 updates the facial feature information of the user whose profile image is registered and the user whose profile image is not registered from the at least one image provided from the mobile terminal 200. For example, the processor 170 adds the facial feature vector(s) of the registrant, which is(are) extracted from the image obtained through the camera 130, and the facial feature vector(s) of the registrant, which is(are) extracted from the at least one image provided from the mobile teitninal 200 as shown in FIG. 11. In addition, the processor 170 extracts the facial feature vector(s) of the non-registrant from the image stored in the mobile terminal 200 and updates the facial feature information of the non-registrant as shown in FIG. 12.

The processor 170 allows the classifier 172 to learn using the added learning data (S330). The classifier 171 learns the facial feature of the registrant and the facial feature of the non-registrant.

Then, the processor 170 performs the face authentication using the classifier 171 that has leafed the facial features of the registrant and non-registrant (S340). For instance, when the sensing device 140 senses the driver who gets in the vehicle, the processor 170 obtains the face image of the driver who gets in the vehicle through the camera 130. The processor 170 analyzes the obtained face image using the classifier 171 to authenticate (recognize) the driver who gets in the vehicle.

Figure 13:
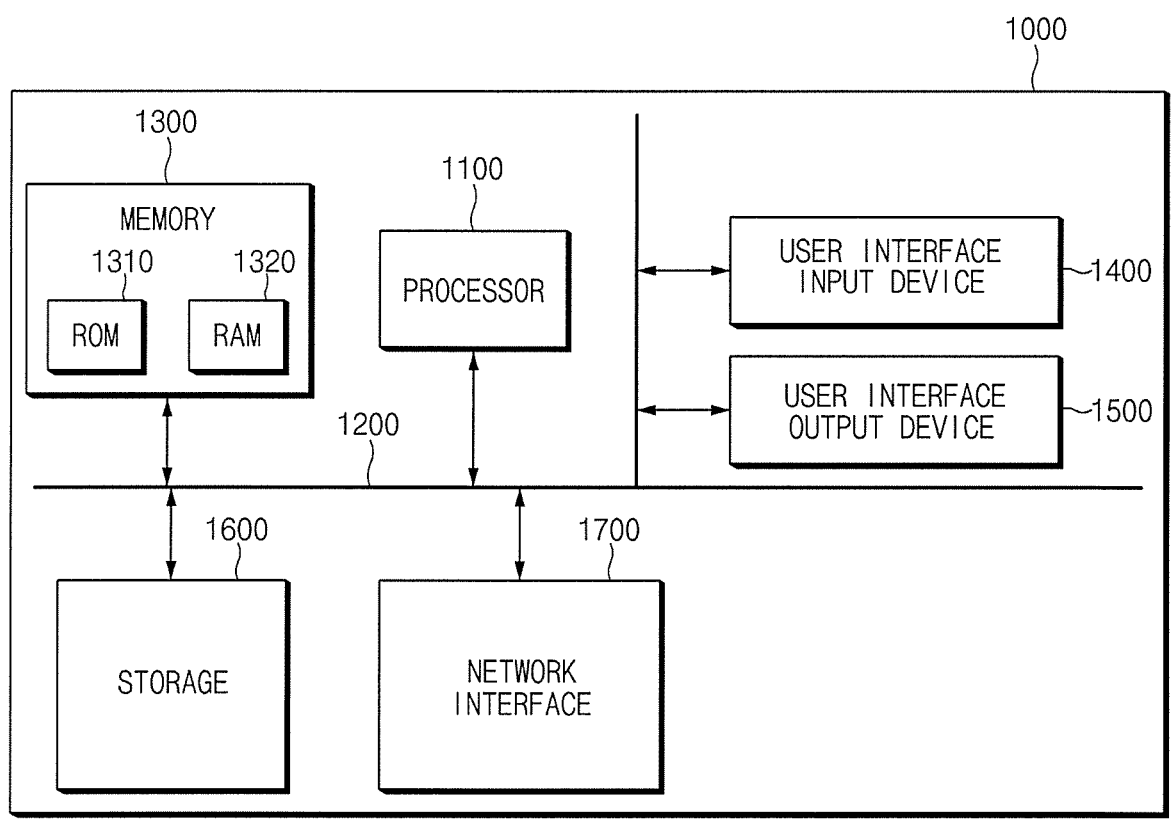
FIG. 13 is a block diagram illustrating a configuration of a computing system that executes a face authentication method according to an exemplary embodiment of the present disclosure.

FIG. 13 is a block diagram illustrating a configuration of a computing system that executes a profile image registration method according to an exemplary embodiment of the present disclosure.

Referring to FIG. 13, the computing system 1000 may include at least one processor 1100, a memory 1300, a user interface input device 1400, a user interface output device 1500, a storage 1600, and a network interface 1700, which are connected with each other via a bus 1200.

The processor 1100 may be a central processing unit (CPU) or a semiconductor device for processing instructions stored in the memory 1300 and/or the storage 1600. Each of the memory 1300 and the storage 1600 may include various types of volatile or non-volatile storage media. For example, the memory 1300 may include a read only memory (ROM) 1310 and a random access memory (RAM) 1320.

Thus, the operations of the methods or algorithms described in connection with the embodiments disclosed in the specification may be directly implemented with a hardware module, a software module, or combinations thereof, executed by the processor 1100. The software module may reside on a storage medium (i.e., the memory 1300 and/or the storage 1600), such as a RAM, a flash memory, a ROM, an erasable and programmable ROM (EPROM), an electrically EPROM (EEPROM), a register, a hard disc, a removable disc, or a compact disc-ROM (CD-ROM). The storage medium may be coupled to the processor 1100. The processor 1100 may read out information from the storage medium and may write information in the storage medium. Alternatively, the storage medium may be integrated with the processor 1100. The processor and storage medium may reside in an application specific integrated circuit (ASIC). The ASIC may reside in a user terminal. Alternatively, the processor and storage medium may reside as a separate component in the user terminal.

While the present disclosure has been described with reference to exemplary embodiments, it will be apparent to those skilled in the art that various changes and modifications may be made without departing from the spirit and scope of the present disclosure. Therefore, exemplary embodiments of the present disclosure are not limiting, but illustrative, and the spirit and scope of the present disclosure is not limited thereto. The spirit and scope of the present disclosure should be interpreted by the following claims, and it should be interpreted that all technical ideas which are equivalent to the present disclosure are included in the spirit and scope of the present disclosure.

What is claimed is:

1. A face authentication system comprising a vehicle terminal installed in a vehicle and a mobile terminal of a user, wherein the vehicle terminal comprises:
   a communicator performing a data communication with the mobile terminal of the user;
   a camera obtaining a face image of the user; and
   a processor configured to:
      learn a facial feature of the user using images stored in the mobile terminal as learning data; and
      analyze the face image obtained through the camera based on the learned facial feature of the user to perform a face authentication of the user,
   wherein the mobile terminal is configured to extract at least one or more images whose similarity with feature vectors included in facial feature information of the user authenticated through the face authentication is equal to or greater than a reference similarity from the images stored in the mobile terminal, and
   the processor is further configured to register one face image among the at least one or more face images, which are provided from the mobile terminal, as a profile image of the user.

2. The face authentication system of claim 1, wherein the communicator is configured to utilize a short-range wireless communication technology corresponding to one of a Bluetooth and a near field communication (NFC).

3. The face authentication system of claim 1, wherein the vehicle terminal further comprises a sensing device for sensing the user who is in the vehicle, wherein the processor is configured to perform an authentication procedure on the mobile terminal through the communicator when the user who is in the vehicle is sensed.

4. The face authentication system of claim 3, wherein the processor is configured to output a welcome message through a display when the authentication procedure performed on the mobile terminal is completed.

5. The face authentication system of claim 4, wherein the processor is configured to output the profile image of the user corresponding to the authenticated mobile terminal with the welcome message.

6. The face authentication system of claim 1, wherein the processor is further configured to:
   identify whether the user authenticated through the face authentication is a user who is restricted in driving; and
   restrict a control operation with respect to the vehicle of the user in accordance with the identified result.

7. The face authentication system of claim 1, wherein the processor is configured to transmit facial feature information of the user authenticated through the face authentication to the mobile terminal of the user.

8. The face authentication system of claim 1, wherein the processor is configured to register a face image having a highest similarity with the feature vectors among the at least one or more images, which are provided from the mobile terminal, as the profile image.

9. The face authentication system of claim 1, wherein the processor is configured to:
   extract a face image of another user from the at least one or more images provided from the mobile terminal;
   extract feature vectors from the extracted face image; and
   add the extracted feature vectors to the learning data.

10. A method for authenticating a face of a user through a face authentication system comprising a vehicle terminal installed in a vehicle and a mobile terminal of the user, comprising:
    allowing the vehicle terminal to learn a facial feature of the user using images stored in the mobile terminal as learning data;
    allowing the vehicle terminal to analyze a face image obtained through a camera and to perform a face authentication based on the learned facial feature;
    allowing the mobile terminal to extract at least one or more face images whose similarity with facial feature vectors included in facial feature information of the authenticated user is equal to or greater than a reference similarity from the images that are stored in the mobile terminal; and
    allowing the vehicle terminal to register one image among the at least one or more face images, which are provided from the mobile terminal, as a profile image of the user.

11. The method of claim 10, wherein the performing of the face authentication comprises:
    sensing whether the user is in the vehicle;
    performing an authentication procedure on the mobile terminal; and
    outputting a welcome message when the authentication procedure of the mobile terminal is successful.

12. The method of claim 11, wherein the welcome message is displayed with the profile image of the user corresponding to the authenticated mobile terminal.

13. The method of claim 10, further comprising:
    allowing the vehicle terminal to identify whether the authenticated user is a user who is restricted in driving; and
    allowing the vehicle terminal to restrict a control operation with respect to the vehicle by the authenticated user when the authenticated user is the user who is restricted in driving after the performing of the face authentication.

14. The method of claim 10, wherein the mobile terminal is configured to transmit the extracted at least one or more face images to the vehicle terminal in the obtaining of the at least one or more face images from the mobile terminal of the user.

15. The method of claim 14, wherein the vehicle terminal is configured to register a face image having a highest similarity with the facial feature vectors among the at least one or more images, which are provided from the mobile terminal, as the profile image of the user in the registering of the profile image of the user.

16. The method of claim 15, wherein the vehicle terminal is configured to utilize the at least one or more face images provided from the mobile terminal as the learning data to learn the facial feature of the user when the profile image is registered.

17. The method of claim 16, wherein the vehicle terminal is configured to:
   extract a face image of another user from the at least one or more images provided from the mobile terminal;
   extract feature vectors from the extracted face image; and
   add the extracted feature vectors to the learning data.

18. The method of claim 10, wherein the vehicle terminal is configured to transmit or receive data to or from the mobile terminal utilizing a short-range wireless communication technology corresponding to one of a Bluetooth and a near field communication (NFC).

* * * * *